US007520751B2

(12) United States Patent
Kim

(10) Patent No.: US 7,520,751 B2
(45) Date of Patent: Apr. 21, 2009

(54) AUTOMATIC PULLING PLUG AND PLUG APPARATUS USING THE SAME

(76) Inventor: Kwang-Bu Kim, 937-107, Suyeong-Gu, Mangmi 1-Dong, Busan (KR)

( * ) Notice: Subject to any disclaimer, the term of this patent is extended or adjusted under 35 U.S.C. 154(b) by 319 days.

(21) Appl. No.: 11/435,616

(22) Filed: May 17, 2006

(65) Prior Publication Data

US 2007/0114853 A1 May 24, 2007

(30) Foreign Application Priority Data

Nov. 22, 2005 (KR) ...................... 10-2005-0111614

(51) Int. Cl.
*H01R 29/00* (2006.01)
*H02B 1/056* (2006.01)

(52) U.S. Cl. ....................................... 439/52; 200/51 R

(58) Field of Classification Search ................... 439/52; 200/51 R

See application file for complete search history.

(56) References Cited

U.S. PATENT DOCUMENTS 4,001,527 A * 1/1977 Hulshizer ............... 200/38 FB

* cited by examiner

*Primary Examiner*—Javaid Nasri
(74) *Attorney, Agent, or Firm*—Jordan and Hamburg LLP

(57) ABSTRACT

An automatic pulling plug and a plug apparatus are disclosed. The automatic pulling plug apparatus includes a plug controlled by a motor which can mechanically disconnect commercial power such that even a small amount of current cannot be applied to electrical loads when the electrical loads do not consume power, and a multiple receptacle box in which a plurality of receptacles are formed, in which the multiple receptacle box is connected to the plug. More specifically, the automatic pulling plug apparatus includes a plug and a multiple receptacle box. The plug includes a plug pin being protruded to the outside and inserted in the receptacle; a movable contact body reciprocating to connect and disconnect a electrical loads to the plug pin; a motor for being reciprocated the movable contact body; a controller for controlling a operation of the motor, and an outer case for protecting the elements of the plug. The multiple receptacle box includes a plurality of the receptacles electrically connected with the plug.

2 Claims, 2 Drawing Sheets

AUTOMATIC PULLING PLUG AND PLUG APPARATUS USING THE SAME

BACKGROUND OF THE INVENTION

1. Field of the Invention

The present invention relates generally to an automatic pulling plug and a plug apparatus using the same, and, more particularly, to an automatic pulling plug apparatus including a plug controlled by a motor, which is capable of mechanically disconnecting commercial power such that even a small amount of current cannot be applied to electrical loads when the electrical loads do not consume power, and a multiple receptacle box in which a plurality of receptacles are formed, in which the multiple receptacle box is connected to the plug.

2. Description of the Prior Art

A receptacle is connected with a plug for various electrical loads to supply commercial power thereto. Namely, the plug is connected with an electric source through the receptacle. In addition, in order to overcome the limited number of receptacles, a receptacle box, or a multi-tap, is configured to include a plurality of receptacles therein, such that a plurality of the electrical loads can connected to the receptacles, respectively.

Also, a timer is installed to the receptacle or the plug for power saving and safety. There has been developed an apparatus, which can supply or cut off power in a semiconductor operation fashion, based on according to time set by a user. In addition, the multi-tap is equipped with security devices, such as a fuse, an over current breaker, etc.

However, since the conventional apparatus to which a timer is installed has a structure to cuts off commercial power based on disconnection operation of weak electricity for a semiconductor, it cannot be functioned as a security device. Also, although various electrical loads do not input electric power as the loads themselves electrically cut off the power in a state where the loads are connected to the multi-tap, a predetermined amount of current is applied to all electrical loads of the plugs from the receptacle to which commercial power is applied. Especially, the multi-tap allows unnecessarily current to apply to a plurality of electrical loads.

Accordingly, although power switches of various electrical loads are turned off, power consumption of the loads cannot be ignored because an amount of current is still applied thereto. Therefore, from the viewpoint of an entire industrial level and a national dimension, an amount of electric power can be consumed.

SUMMARY OF THE INVENTION

Accordingly, the present invention has been made keeping in mind the above problem in the prior art, and an object of the present invention is to provide a mechanically electric-cutting apparatus which is capable of completely disconnecting a plug connected to electric loads from a receptacle to which commercial power is applied, such that it can provide electrical safety and power saving advantages.

According to an aspect of the present invention, there is provided automatic pulling plug apparatus which is capable of mechanically connecting and disconnecting a plug pin by a motor, in which the motor is installed to the inside of a receptacle to which commercial power is applied.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
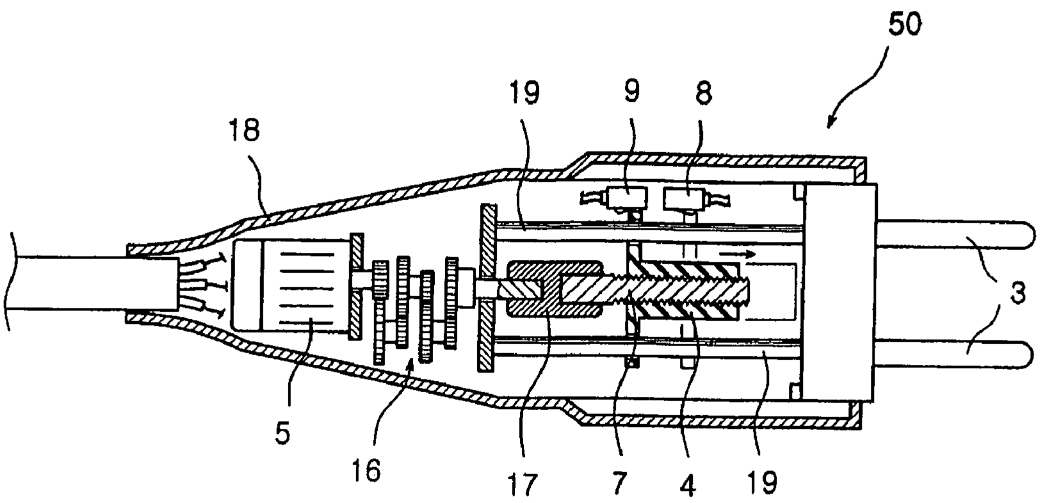
FIGS. 1 and 2 are sectional views showing an operation of the plug according to the present invention.

Preferred embodiments of the present invention will be described in more detail with reference to accompanying drawings.

According to an embodiment of the present invention, an automatic pulling plug apparatus 100 includes an automatic pulling plug 50 for performing a mechanical control of commercial power, and a multiple receptacle box 2 having a plurality of receptacles 1, in which the multiple receptacle box 2 is connected to the automatic pulling plug 50.

The automatic pulling plug 50 of the present invention includes a plug pin 3 being protruded to the outside such that it can be inserted to the receptacle, a movable contact body 4 for reciprocating to connect and disconnect the plug pin 3 to electrical loads, a motor 5 for reciprocating the movable contact body 4, a controller for controlling operation start of the motor 5, and an outer case 18 for protecting elements in the plug 50.

The movable contact body 4 forms a female screw thereon, and the motor 5 is configured to rotate a screw shaft 7 coupled to the female screw. Also, the movable contact body 4 is configured to control ON/OFF operations of the motor 5 on the basis of a proximity limit switch 8 and a remotion limit switch 9 which are installed being spaced apart from with a predetermined distance. The movable contact body 4 is coupled to a guide 19 along which it performs a rectilinear movement.

The controller includes a timer for controlling an operation start of the motor 5, a setting unit for setting time of the timer, and a battery for supplying electric power to the timer, the motor 5 and the setting unit.

As described above, the automatic pulling plug 50 of the present invention may be controlled by a remote control. The controller and the remote control may further include a transceiver, such as an RF receiver, etc.

By using the plug 50, the plug apparatus 100 can be configured such that it can simultaneously connect and disconnect a plurality of electrical loads thereto. In this case, the plug apparatus 100 includes the plug 50 and a multiple receptacle box 2 having a plurality of the receptacles 1 which are electrically connected with the plug 50. Also, the plug apparatus 100 may be configured such that the controller installed to the plug 50 can be installed to the multiple receptacle box 2. In this case, the plug apparatus 100 includes the plug 50 having a plug pin 3 for being protruded to the outside and inserted into the receptacle, a movable contact body 4 for reciprocating to connect and disconnect electrical loads to the plug pin 3, a motor 5 for being reciprocated the movable contact body 4, and an outer case 18 for protecting the elements of the plug 50; and a multiple receptacle box 2 having a plurality of the receptacles 1 electrically connected with the plug 50, a timer for operating the motor 5, a setting unit for setting time of the timer, and a controller 6 for controlling an operation of the motor 5, in which the controller 6 includes a battery for supplying electric power to the timer, the motor 5 and the setting unit.

In addition, the plug apparatus 100 having the multiple receptacle box 2 can be configured to control setting of the automatic pulling plug 50 using a remote control 13. In this case, the controller 6 and the remote control 13 may further include a transceiver, such as an RF receiver.

As described above, the plug 50 or the plug apparatus 100 having various structures serves to completely and mechanically cut off commercial power supplying to the electrical loads as occasion demands. Accordingly, a device is installed to the inside of the plug 50, such that it can mechanically disconnect the receptacle, to which commercial power is applied, with the plug 3, which inserted to the receptacle.

Figure 3:
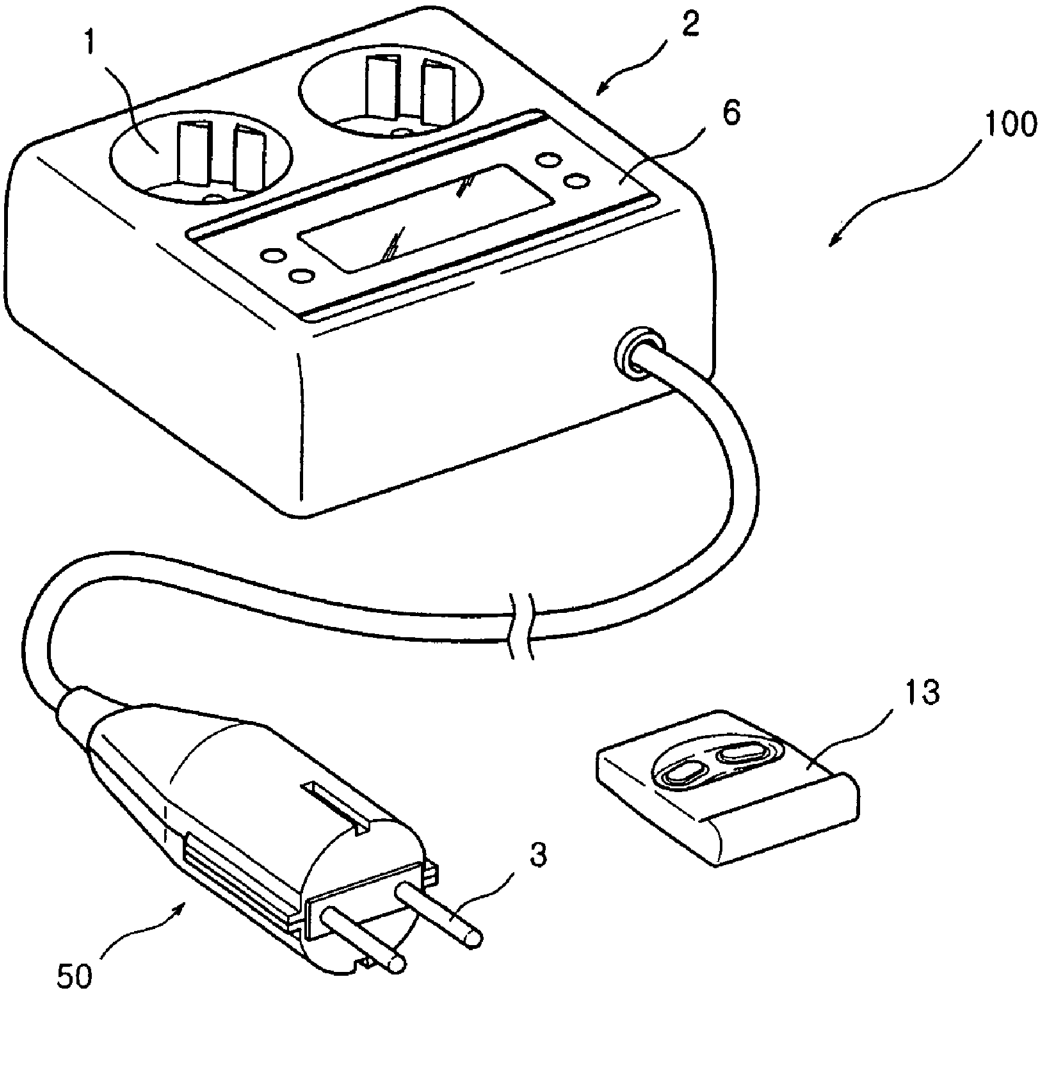
FIG. 3 is a perspective view showing a configuration of the plug apparatus according to the present invention.

FIG. 1 and FIG. 3 illustrate the above-described structures and operations thereof. Herein below, the operation based on an embodiment of the plug apparatus 100 will be described in more detail.

The user inserts the plug into the receptacle to supply electric power to the electrical loads. In case of disconnection of the electric source after a predetermined time lapses, time of electric power consumption is inputted to a setting part of the controller so that the electric power cannot be supplied thereto after the set time.

The use time is time which the timer counts, and the electric power is applied to the motor 5 after the predetermined time lapses. In addition, a start button is provided to the controller 6 to count a predetermined time by instructing an operation of the timer. The start button may be installed to the remote control 13.

When the timer is operated as the start button is pressed, commercial power is applied to the electrical loads for the setting time. After the setting time, the timer is operated such that electric power can be supplied to the motor 5, thereby operating the motor.

The motor 5 serves to rotate the screw shaft 7 to move the movable contact body 4, such that connection between a moving contact 14, which is installed to the movable contact body 4, and a fixed contact 15, which is installed to the plug pin 3, are separated. Here, the rotation shaft of the motor 5 can be the screw shaft 7, and the rotation number of the rotation shaft of the motor 5 is decreased through a decelerator 16, and then, the screw shaft 7 and the decelerator 16 are connected each other through a coupler 17.

The screw shaft 7 is screwed with the movable contact body 4, such that rotation of the screw shaft 7 allows the movable contact body 4 to perform a rectilinear movement.

Also, movement of the movable contact body 4 is controlled by a limit switch. When electric power is controlled, the movable contact body 4 is moved its left to operate a remotion limit switch 9, which is installed at an area in which the moving contact 14 and the fixed contact 15 are sufficiently spaced apart therebetween. Therefore, the electric power is not supplied to the motor 5.

Here, the electric power of the motor 5 may be obtained from a commercial power source or from a battery installed into the controller 6.

Figure 2:
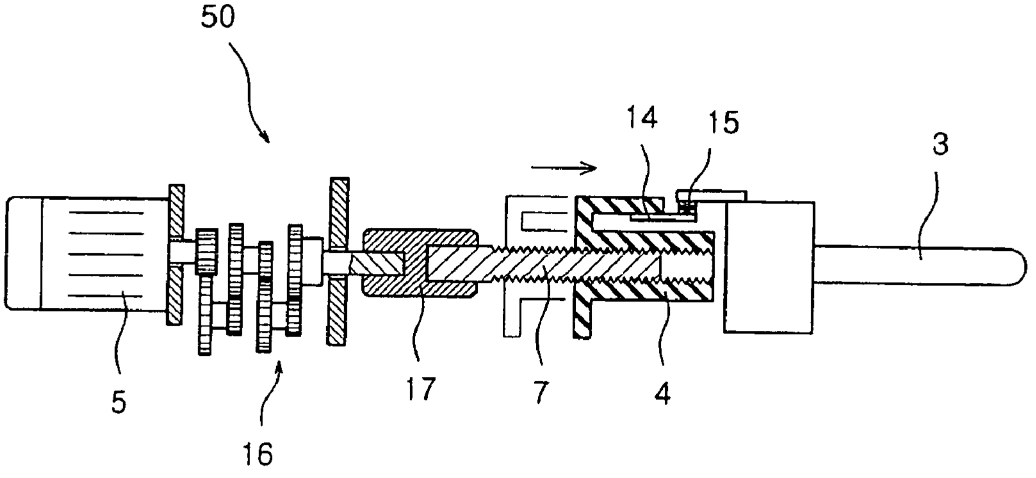

In addition, electric power can be supplied to the electrical loads after a predetermined time elapses. To this end, operation time of the timer is set through the setting unit. In this case, the rotation direction of the motor 5 must be performed to the opposite direction. When electric power is applied thereto, a user can directly operate the motor 5 without operation of the time, such that commercial power can be provided thereto. Regarding all of the above-described cases, as shown in FIG. 2, the screw shaft 7 is rotated according to operation of the motor 5, and the movable contact body 4, which is coupled to the screw shaft 7, is moved to its right, such that the moving contact 14, which is installed in the movable contact body 4, is connected with the fixed contact 15, which is fixed by a connection of the plug pin 3. Therefore, commercial power can be applied to the electrical loads.

As described above, the present may be configured to use the remote control 13 to connect and disconnect a commercial source to the electrical loads, thereby providing convenience to users. In this case, the transceiver, such as, an RF receiver, is installed to the controller 6 and the remote control 13 so that signals can be transmitted and received therebetween.

The electrical loads connected by the plug 50 of the present invention maintenances very safety state electrically because it is disconnected by a point of contact contacting mechanically from the commercial power after a predetermined time, therefore it can be obtained the effects that a fire and electricity leakage due to the electricity can be prevented because the electrical loads is not used and the power saving can be accomplished because weak electricity even is not applied to the electrical loads. In addition, the plug apparatus 100 of the present invention can prevent consumption of the electric power and safety accident due to an excessive electric load, because although a plurality of the electrical loads are connected with the multiple receptacle box 2, the electric power can be mechanically and entirely disconnected.

What is claimed is:

1. An automatic pulling plug comprising a plug connected to electrical loads, wherein the plug includes:
- a plug pin protruding to the outside and inserted into a receptacle;
- a movable contact body reciprocating to connect and disconnect electrical loads to the plug pin;
- a motor for reciprocating the movable contact body;
- a controller for controlling operation of the motor;
- an outer case for protecting the elements of the plug;
- the movable contact body having a female screw; and
- the motor is configured to rotate a screw shaft which is coupled to the female screw.

2. An automatic pulling plug comprising a plug connected to electrical loads, wherein the plug includes;
- a plug pin protruding to the outside and inserted into a receptacle;
- a movable contact body reciprocating to connect and disconnect electrical loads to the plug pin;
- a motor for reciprocating the movable contact body;
- a controller for controlling operation of the motor;
- an outer case for protecting the elements of the plug;
- the outer case having a proximity limit switch and a remotion limit switch which are spaced apart at a predetermined distance within a movable section of the movable contact body, such that the operation of the motor is controlled by the operation of the proximity limit switch and the remotion limit switch while the movable contact body is moved.

* * * * *